United States Patent [19]

Freischlad

[11] Patent Number: 5,185,810
[45] Date of Patent: Feb. 9, 1993

[54] METHOD FOR OPTICAL TESTING OF SAMPLES

[75] Inventor: Klaus Freischlad, Aalen, Fed. Rep. of Germany

[73] Assignee: Carl-Zeiss-Stiftung, Heidenheim/Brenz, Fed. Rep. of Germany

[21] Appl. No.: 692,194

[22] Filed: Apr. 26, 1991

[30] Foreign Application Priority Data

Apr. 26, 1990 [DE] Fed. Rep. of Germany ....... 4013308

[51] Int. Cl.⁵ .................. G06K 9/00; G01B 11/24; G01B 9/02
[52] U.S. Cl. .................................. 382/8; 356/359; 356/376
[58] Field of Search ............... 356/345, 359, 376, 371; 382/8

[56] References Cited

U.S. PATENT DOCUMENTS

| | | | |
|---|---|---|---|
| 4,768,881 | 9/1988 | Jüptner et al. | 356/359 |
| 4,791,584 | 12/1988 | Greivenkamp | 364/525 |
| 4,832,489 | 5/1989 | Wyant et al. | 356/359 |

FOREIGN PATENT DOCUMENTS 0262089  9/1987  European Pat. Off. .
3600672  7/1987  Fed. Rep. of Germany .

OTHER PUBLICATIONS

Kazuyoshi Itoh, "Analysis of the Phase Unwrapping Algorithm", *Applied Optics*, vol. 21, No. 14, p. 2470, 1982.
Dennis C. Ghiglia, et al. "Cellular-automata Method for Phase Unwrapping", *Journal of Optical Society of America*, vol. 4, No. 1, pp. 267-280, 1987.

*Primary Examiner*—Leo H. Boudreau
*Assistant Examiner*—Christopher Kelley
*Attorney, Agent, or Firm*—Eugene Stephens & Associates

[57] ABSTRACT

The optical testing method of the invention permits the reliable elimination of discontinuities, i.e., the determination of the integer values of modulo $2\pi$ phase differences, even when the measured data includes seriously noisy signals. The intensity signals from a two-dimensional raster of camera image points are used to compute differences in phase values between adjacent image points in lines, as well as between adjacent image points in columns. The phase differences are summed along a closed path around each of a plurality of partial fields which are delineated by a predetermined set of adjacent image points. A filter (21) searches the vector field of these phase differences; and those partial fields where vortexes exist, i.e., each field for which the sign-correct sum along its closed path is not zero, are masked, thereby creating holes in the image pattern. Additional closed paths are summed around these holes and, by masking further image points between these holes, the masked partial fields are combined until the path integral around each of these combined holes disappears. The final phase value data used for display of a phase map of the sample is calculated by path integration of the unmasked image points; and inconsistent measured values, e.g., due to noisy signals, do not corrupt the phase map.

7 Claims, 5 Drawing Sheets

METHOD FOR OPTICAL TESTING OF SAMPLES

TECHNICAL FIELD

The invention relates to the type of optical testing where information relating to a sample being tested is in the form of a light pattern recorded by a video camera. The pattern is produced by interference or by distortion of a projected bar pattern, and the phase values at selected pixels of the recorded image are used to create a phase diagram or chart of the sample.

BACKGROUND

There are many different known methods for optical testing of samples. Interferometry is one of the better known methods.

In interferometric surface testing, a lightwave reflected by the surface of an object and a lightwave reflected by a reference surface are superimposed in an interferometric manner. The resulting pattern of varying light intensities contains information as to the deviations of the object surface from the reference surface. This brightness pattern is usually recorded by a camera.

Interferometric testing may similarly be carried out by using transmitted light. A light beam is split into a measuring beam portion and a reference beam portion, and the measuring beam is passed through a transparent sample. Then both optical paths are superimposed in an interferometric manner to generate a brightness pattern which is recorded by a camera.

The image of the brightness pattern is used to calculate phase values—associated with the brightness of each point (pixel) of the camera image—which are combined to form a phase image. Various methods are known for the calculation of these phase values. Some of these methods, as well as their advantages and disadvantages, have been discussed in a well-known thesis by B. Dorband, University of Stuttgart (1986).

Due to the periodicity of the interference equation, the phase value belonging to a particular level of brightness can, however, only be calculated up to an integral multiple of the number $2\pi$, i.e. in modulo $2\pi$. If this unknown integral multiple is set equal to zero, even the phase images for objects whose surfaces are continuous will exhibit so-called "discontinuities". At these discontinuities, the difference between the calculated phase values of adjacent points has an absolute value greater than the number $\pi$. To generate a phase map of the contours of the sample surface or of the deviations of the sample from a reference element, the proper integer multiple of $2\pi$ must be determined for the phase values, i.e., the elimination of discontinuities is necessary.

In *Applied Optics*, Vol. 21, No. 14, Page 2470 (1982), K. Itoh has described a method for the elimination of discontinuities in a measuring system in which the camera records the image of the pattern along only one line: initially only the differences between the phase values of adjacent points of the camera image are calculated. Based on the sampling theorem, these differences must have an absolute value smaller than $\pi$ in order to be able to identify unambiguously those discontinuities in which the difference has an absolute value greater than $\pi$. Therefore, where such discontinuities occur, the number $2\pi$ is added to or subtracted from these differences so that the corrected differences between the phase values are between $-\pi$ and $+\pi$. In this manner, these differences are expressed in terms of modulo $2\pi$. By integrating these phase difference values over the entire phase image, a phase map without discontinuities is ultimately obtained. In such a phase map, the integral multiple of the number $2\pi$ of the phase values is determined, and the deviations of the object surface from the reference surface can be calculated in an unambiguous manner.

An extension of this Itoh method to two-dimensional camera images has been described by D. C. Ghiglia et al., *Journal of the Optical Society of America*, Vol. 4, No. 1, Page 267 (1987). As explained in that paper, the differences between the phase values of adjacent data points in lines, as well as in columns, are calculated; and these differences are expressed in modulo $2\pi$. A final phase map is obtained by path integration via the differences between the phase values or by iterative integration by means of cellular automatic systems; the latter process, however, is considerably slower than path integration.

If the output signals of the camera are noisy, inconsistencies, i.e., wrongly identified discontinuities, may occur. The difference between the phase values of adjacent data points may, for example, have an absolute value greater than $\pi$, even though there is no discontinuity. If the phase-value integration includes these inconsistencies, the calculation of integral-multiple phase differences would depend upon the particular path of integration. That is, the use of a few data points exhibiting inconsistencies caused by noisy measured values can result in a global corruption of the final phase map.

In order to suppress part of the inconsistent measured values, the authors (Ghiglia et al.) calculate the sign-correct sum of the modulo $2\pi$ differences between the phase values along a closed path around partial fields consisting of each set of four adjacent data points throughout the entire data field. If the sum does not equal zero, all four data points are masked and are no longer considered during further evaluation. In mathematical terms, the vector field of the modulo $2\pi$ differences between the phase values must not exhibit local vortexes. The inconsistent measured values for the masked data points are not considered in the phase-value integration. This prevents global corruption of the phase map by these inconsistent measured values. However, this method identifies only a part of the inconsistent measured values; and, while these are omitted from the final integration, the authors of this paper have conceded that global corruption of the phase map may still result from the remaining inconsistent measured values.

Numerous other publications, among others German Patent No. DE OS 36 00 672 and European Patent No. EP OS 0 262 089, have disclosed the projection of a bar pattern on the surface of an object and the recording of said bar pattern by a camera. The contours of the object surface cause deformations of the bar pattern recorded by the camera, and the evaluation of the camera image is analogous to the evaluation of interferometrically generated brightness patterns. Namely, a phase value of the bar pattern is first calculated from the brightness of each point (pixel) of the camera image, and then the calculated phase values are combined to form a phase image. This phase image also has discontinuities, because the phase values can be calculated only up to an integer multiple of the number $2\pi$; and in these methods the discontinuities can also be identified erroneously when the measured phase values are noisy.

SUMMARY OF THE INVENTION

The invention herein provides a method which permits the suppression of additional inconsistent phase values which are not detected with conventional methods, thereby increasing the reliability of the calculated phase maps.

The invention improves the method described by Ghiglia et al. by introducing additional steps in which a second sign-correct sum of the modulo $2\pi$ differences (between image point phase values) is computed for further closed paths whose image points are positioned around the "holes" in the image field created by the initially-masked partial fields. By masking further image points between these holes, the masked partial fields are combined until the path integral around each of these combined holes disappears, i.e., until the sign-correct sum of the closed path surrounding the combined partial fields becomes zero.

As described by Ghiglia et al.: first, the entire two-dimensional data field is divided into a plurality of small partial fields, and a first sign-correct sum of the modulo $2\pi$ differences between the phase values is calculated on a closed path around each partial field. Those small partial fields, for which this sum does not disappear, are masked, thereby generating holes in the two-dimensional data field for which no measured values are available for evaluation. During the invention's step of computing a second set of sign-correct sums of the differences, the holes are divided into two classes: those for which the second sum disappears and those for which the second sum does not disappear. The disappearance of this second sum is an indication that the observed inconsistency of the measured values in the masked partial field is localized. Otherwise, if this second sum does not disappear, the observed inconsistency of the measured values is not localized in the masked partial field but, rather, is distributed over several partial fields. By masking data points located between such holes of the latter class, these separate holes are combined into a single larger partial field; and in this manner, the inconsistencies of the measured values throughout the entire data field are localized in these combined partial fields.

When there are only holes of the first class left, i.e., holes for which the second sum of the differences disappears, the integral over the remaining unmasked differences is independent of the integration path; and the phase map may be calculated unambiguously. Therefore, the inventive method prevents phase values based upon bad, e.g., noisy, signals from globally corrupting the phase map created from the camera image.

It is always possible to suitably combine the holes with each other and/or, optionally, with the external edge of the two-dimensional data field, so that the combined partial fields include all of the inconsistent image points. In order to avoid unnecessary masking, an additional sum of the modulo $2\pi$ differences (between the image/data point phase values) should be calculated along a closed path comprising the external edge of the two-dimensional image/data field. The value of this additional sum indicates whether the external edge of the two-dimensional field can be combined with one or more of the internal partial fields for which the second sum does not disappear.

If the external edge of the two-dimensional data field is very irregular, those image points which do not belong to at least one partial field should be masked. Further, in order to combine the partial fields with each other or with the external edge of the two-dimensional field, the shortest path between these inconsistent partial fields is selected. This assures that no more data points are masked than are absolutely necessary.

Preferably, the two-dimensional data field is initially divided into partial fields, each containing four data points which form a square, i.e., the first two data points are adjacent on a line and the other two data points are adjacent to each of the first two data points in a column. As a result, the two-dimensional data field is very finely divided by the initial partial fields.

For further evaluation of the light pattern image, a final phase value is calculated for each unmasked data point, this final phase value resulting from the summation of the modulo $2\pi$ differences between the initially-calculated phase values along a path of unmasked data points which extends from a common reference point to a specific data point. As a result of the just-described procedures, all of the phase-value inconsistencies are localized within masked partial fields; and the final phase values of the unmasked points are not a function of the particular path along which the modulo $2\pi$ differences between the phase values are summed and, hence, are unambiguous. Such summations are carried out considerably faster than the iterative integration described by Ghiglia et al.

Further, final phase values for the masked data points can then be calculated by adding to the unambiguous final phase values of the unmasked data points the appropriate modulo $2\pi$ differences between the initial phase values. Even though the final phase values of the masked data points may still be ambiguous, these ambiguous phase values are restricted to individual points of the phase map and do not impair the computation of the phase values of the consistent image points.

The pattern recorded by the camera may be an interferogram, or it may be a bar pattern projected on the sample; and in both cases, the measuring light can either be reflected by or transmitted through the sample.

DRAWINGS

Figure 3A:
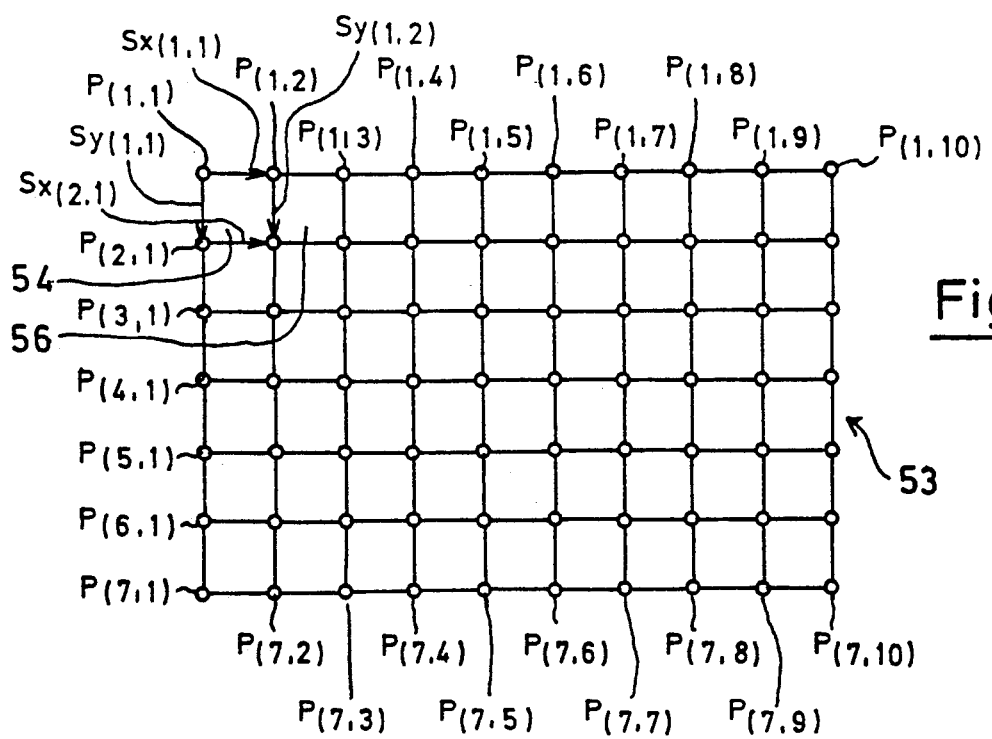
Figure 3B:
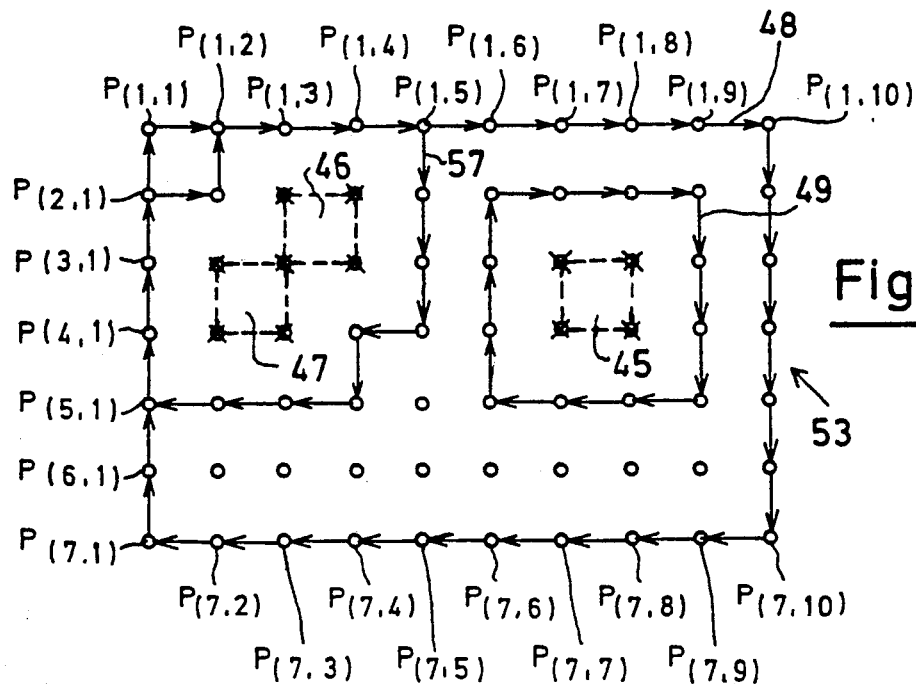
Figure 3C:
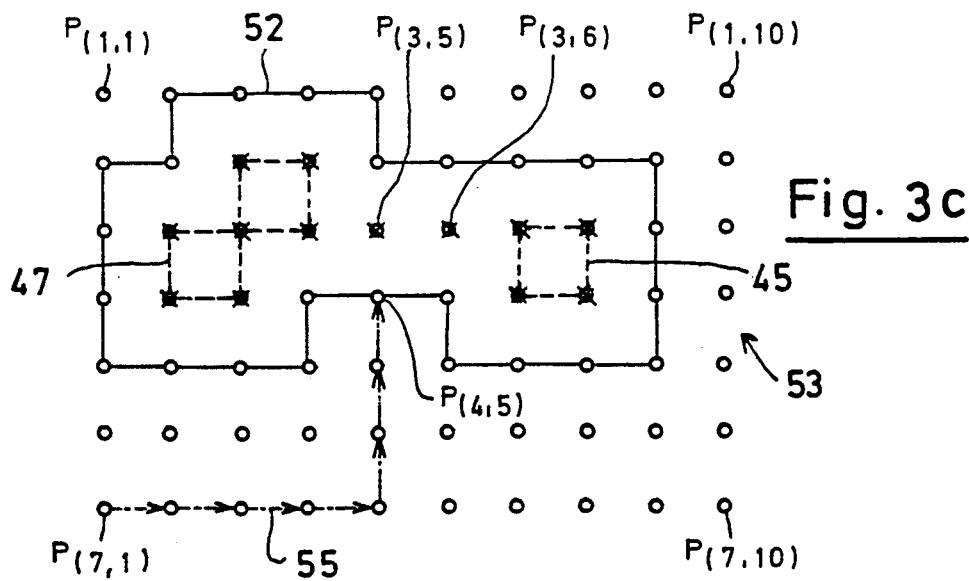

FIGS. 3a–c represent the same partial image field of 10×7 data points and illustrate three successive steps of the inventive method.

DETAILED DESCRIPTION OF PREFERRED EMBODIMENTS

Figure 1A:
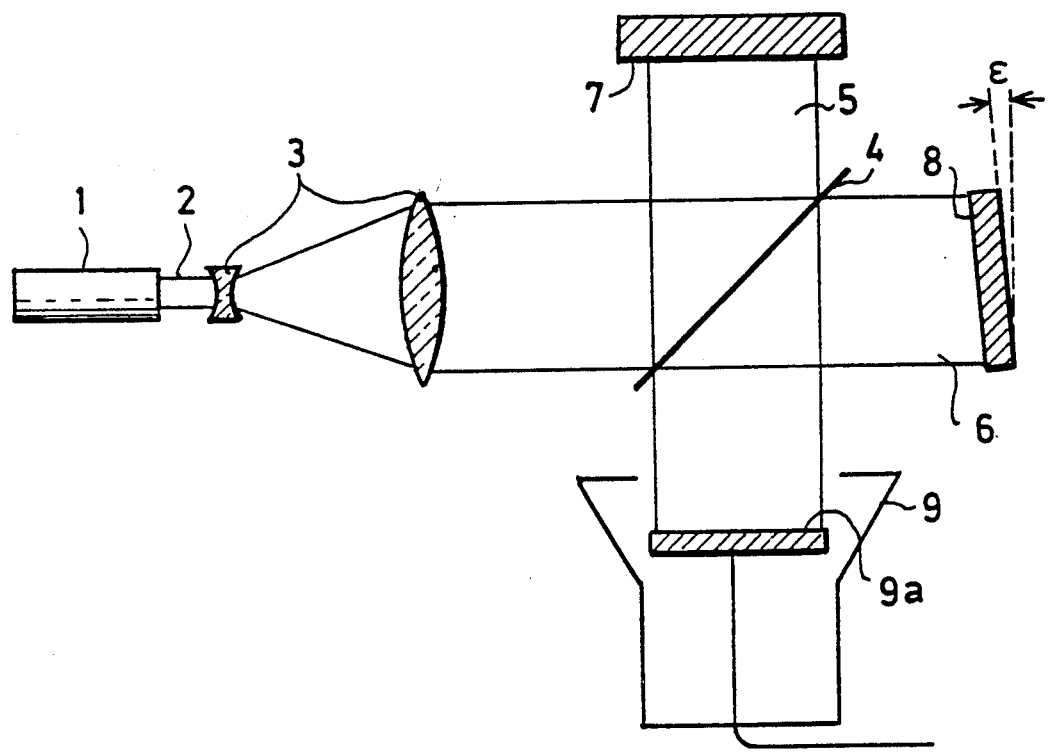
FIG. 1a is a schematic illustration of an interferometer which can be used with the invention for testing sample surfaces.

The arrangement of FIG. 1a shows a laser 1 and a laser beam 2 which is expanded by a telescope 3. A beam splitter 4 directs the expanded laser beam into an optical measuring path 5 and into an optical reference path 6. The light in optical measuring path 5 is reflected by the sample surface 7, and the light in optical reference path 6 is reflected by a reference mirror 8, the reflected light from both paths then being directed by beam splitter 4 to the sensor 9a of a CCD camera 9. Camera sensor 9a records the interference of the reflected light. This recorded light pattern is an interferogram which contains information regarding deviations of the sample surface from the reference surface.

In order to generate a spatial carrier frequency ($f_o$), reference mirror 8 is inclined by a small angle ($\epsilon$) to optical reference path 6. The light intensity I(x,y) of the interferogram is determined by the interference equation:

$$I(x,y) = a(x,y) + b(x,y) \cos(2\pi f_o x + w(x,y))$$

where a(x,y) represents an apparatus-specific "constant" generated, for example, by scattered light, discontinuities of the profile of laser beam 2, or a location-dependent sensitivity of camera sensor 9a. Laterally different reflectivities of the sample surface 7 and the reference mirror 8 are described by the location-dependent modulation b(x,y), and w(x,y) describes the phase values associated with the contours of the sample surface.

The phase values w(x,y) are calculated for each point of the camera image and converted to a phase image by spatial Fourier transformation as described in the above-cited thesis by B. Dorband.

The phase values may also be calculated by another method, for example, by "phase-stepping within the time frame", as described by Dorband. In this other method, a phase image is composed of several camera images and, between the recording of each image, reference mirror 8 is shifted parallel to the optical axis. Although this latter method is somewhat slower, it provides greater accuracies.

Based on the $2\pi$ periodicity of the interference equation, the phase values w(x,y) can be determined only up to an integral multiple of the number $2\pi$ based on the light intensities I(x,y) of the interferogram. More specifically, the calculated phase values range between $-\pi$ and $+\pi$. If the phase difference between the two interfering light paths 5,6 exceeds the number $\pi$ at any point, the calculated phase image exhibits a "discontinuity" at this point, namely, the difference between the phase values w(x,y) of adjacent points of the phase image has an absolute value greater than $\pi$.

Figure 1B:
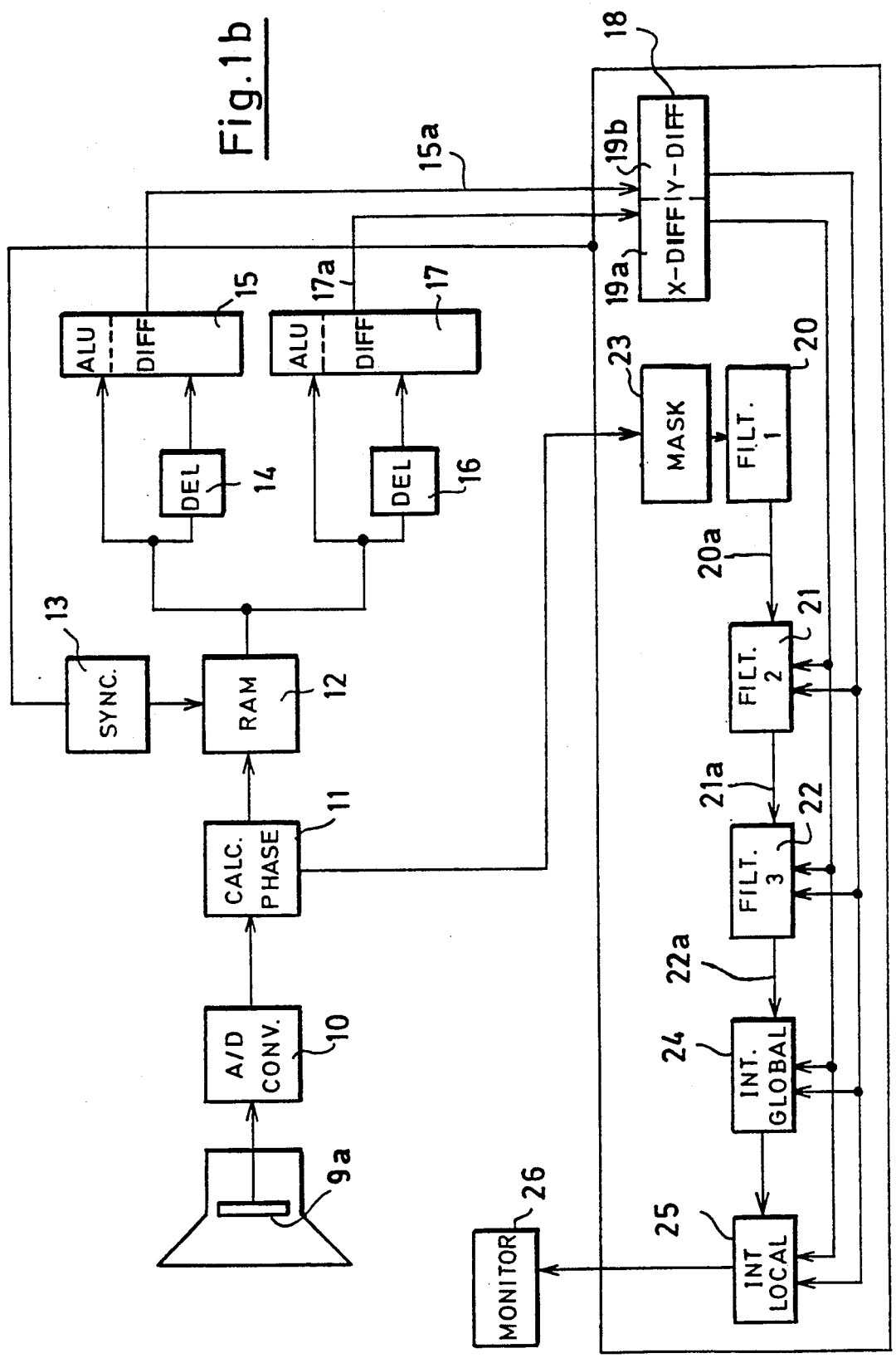
FIG. 1b is a block circuit diagram of electronic apparatus for evaluating an interferogram by the inventive method.

Referring now to FIG. 1b, in order to evaluate the image recorded by camera sensor 9a, the output signals of camera sensor 9a are digitized in an analog-to-digital converter 10 to an 8-bit data width. A calculating unit 11 computes the phase values associated with each image data point by spatial Fourier transformation according to the well-known method described in B. Dorband's thesis, which will not be discussed in detail here. The computed phase values are then stored in an image buffer 12 which may be omitted if the subsequent operation of the various electronic components is sufficiently rapid.

Image storage 12 is read out serially at a fixed frequency set by a synchronization unit 13. The output signals of image storage 12 are fed to the inputs of two arithmetic logic units 15,17 designed as differentiators. One of the two input channels of the first differentiator 17 contains a delay line 16, the effect of which delays—by exactly one period—the frequency set by synchronization unit 13. Therefore, differentiator 17 computes the differences between the phase values of adjacent data points in a line. The data width of the output signals of differentiator 17, like the data width of its two input channels, is 8 bits. The difference between the phase values of each set of adjacent data points in a line is represented in modulo $2\pi$ and is stored permanently in a memory 19a of a computer 18.

One of the two input channels of the second differentiator 15 also contains a delay line 14. However, the delaying effect of delay line 14 is "n" periods of the frequency given by synchronization unit 13. In this case, n represents the number of image/data points in a line of camera sensor 9a. Therefore, differentiator 15 computes the difference between the phase values of adjacent data points in a column. Again, these differences are expressed in modulo $2\pi$ because the output signals of differentiator 15 have the same data width as its input signals. The modulo $2\pi$ differences between the phase values of adjacent data points in a column are stored permanently in a memory 19b of computer 18.

If averaging over several phase images is desired, an addition unit and an image storage may be provided on the data paths 15a,17a between the subtraction units 15,17 and their respective storages 19a,19b. When these units are connected as shown in my related patent application filed on the same date, the camera images may be averaged in video real time.

If the contrast of the camera image is too low at an image point, i.e., if the point has insufficient modulation b(x,y), this data point is marked invalid in a masking field provided in a storage 23. Each data point is assigned a binary memory location in the storage 23. A logical "1" of the memory location identifies the associated data point as valid, whereas a logical "0" identifies the associated data point as invalid.

Figure 1C:
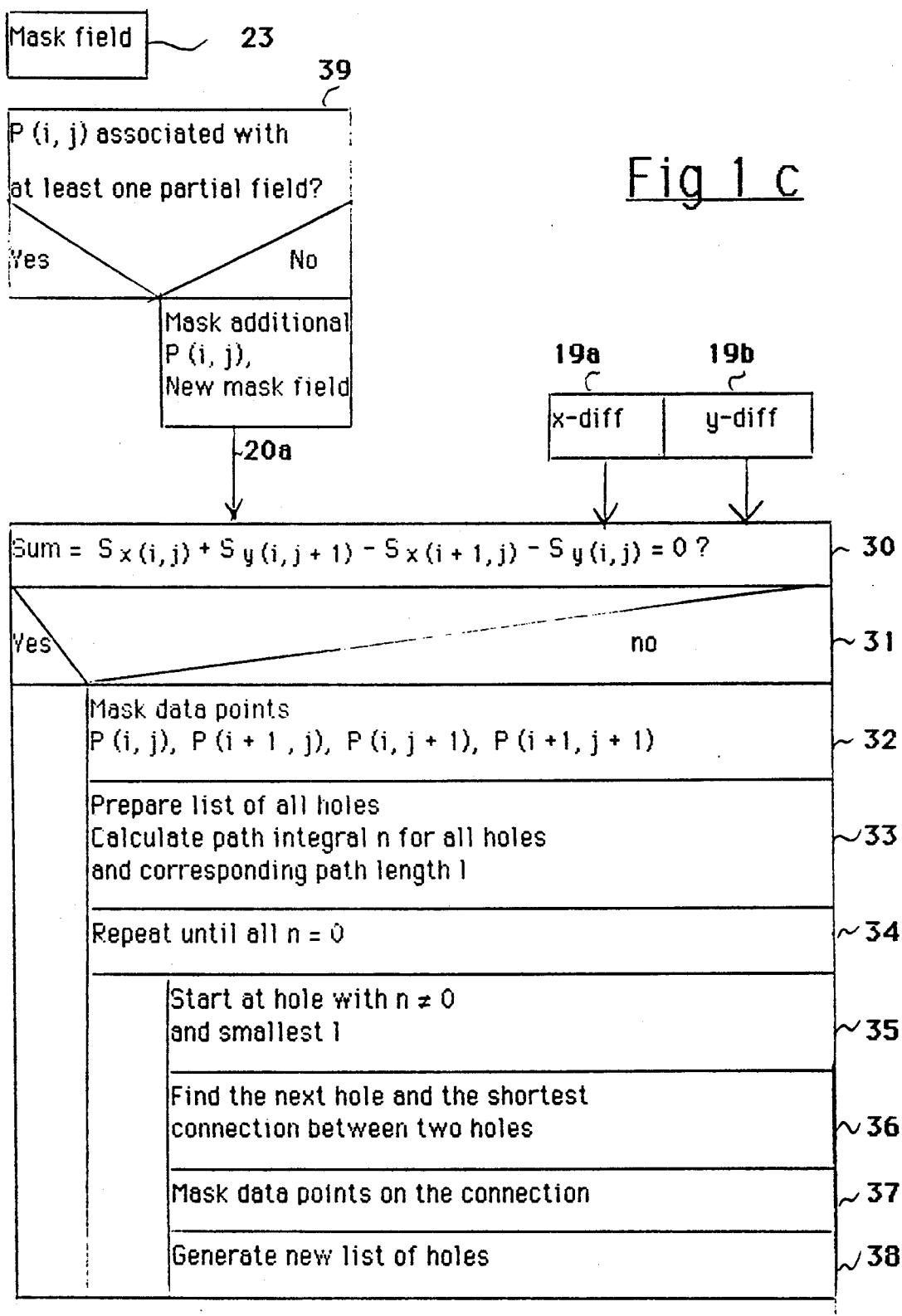
FIG. 1c is a flow chart of operations carried out in the three filters illustrated in FIG. 1b.

The mask field provided by storage 23 is modified by three successive filters 20,21,22. The effect of these filters is best explained by reference to the flow chart of FIG. 1c. In first filter stage 20, each data point $P_{(i,j)}$, which is marked as valid in the storage 23, is checked to determine if it is associated at least with a partial field (operation 39), i.e., it is determined if each data point $P_{(i,j)}$ is at least associated with one of the four 3-point sets surrounding $P_{(i,j)}$ [explained more fully below with reference to FIG. 2], namely, $(P_{(i+1,j)}, P_{(i,j+1)}, P_{(i+1,j+1)})$ $(P_{(i+1,j)}, P_{(i+1,j-1)}, P_{(i,j-1)})$ $(P_{(i,j-1)}, P_{(i-1,j-1)}, P_{(i-1,j)})$ $(P_{(i-1,j)}, P_{(i-1,j+1)}, P_{(i,j+1)})$ If this is the case, then $P_{(i,j)}$ is marked a valid point in the mask field. Those data points which are not associated with at least one partial field are marked as invalid; and the resulting modified mask field is transferred, via a data path 20a, to a second filter 21 which performs the subsequent arithmetic operation 30 (FIG. 1c). Namely, a sum is determined $$Sum_{(i,j)} = S_{x(i,j)} + S_{y(i,j+1)} - S_{x(i+1,j)} - S_{y(i,j)} \quad (1)$$

for each expanded partial field of four data points (($P_{(i,j)}$, $P_{(i+1,j)}$, $P_{(i,j+1)}$, $P_{(i+1,j-1)}$) which have been identified as valid. In equation (1), $$S_{x(i,j)} = (w_{(i,j+1)} - w_{(i,j)}) \mod 2\pi \quad (2)$$

represents the modulo $2\pi$ differences between the phase values adjacent data points in a line ($P_{(i,j)}$, $P_{(i,j+1)}$) and $$S_{y(i,j)} = (w_{(i+1,j)} - w_{(i,j)}) \mod 2\pi \quad (3)$$

represents the modulo 2π differences between the phase values of adjacent data points in a column ($P_{(i,j)}$, $P_{(i+1,j)}$) stored in memory 19b. A further logical operation 31 identifies—in addition to the data points identified so far as invalid—all four data points $P_{(i,j)}$, $P_{(i+1,j)}$, $P_{(i,j+1)}$, and $P_{(i+1,j+1)}$ as invalid if the sum of equation (1) does not disappear. Via data path 21a, the appropriately modified mask field is then transferred to a third filter 22.

Operation 32 of FIG. 1c is performed by filter 22, which masks the data points identified as invalid and thereby generates holes in the image field. By an arithmetic operation 33, a list of all holes is prepared; the path integral (n) is computed for the differences of the phase values along the hole edges for all holes; and the length of the integration path is noted, i.e., the number of the differences between the phase values summed during the integration. The calculation of these hole path integrals will be explained in detail hereinafter.

Next, a loop operation 34 is carried out until the path integrals (n) for all holes equal zero. Within loop operation 34, first the hole with the smallest hole edge, for which the value of the integral (n) is not equal to zero, is searched (operation 35). During a subsequent operation 36, the next hole and the shortest connection between the two holes is searched. By masking the data points on this shortest connection between two holes, the holes are combined with each other (operation 37). Then a new hole list is prepared (operation 38) which contains the just-generated combined hole. Operations 34-38 are repeated until all holes are surrounded by paths of image points which are positioned along the edges of the holes and for which the respective path integrals (n) disappear when the modulo 2π differences between the phase values of image points positioned along the respective paths are summed.

The mask field modified by filters 20,21,22 is transferred, via the data path 22a, to a computing unit 24 which computes, for the unmasked data points, final phase values by path integration of the modulo 2π differences between the initial phase values stored in storages 19a,19b. The multi-step masking procedure just described above assures that these final phase values for the unmasked data points are independent of the chosen integration path. Using the final phase values for the unmasked data points, another computing unit 25 computes final phase values for the masked data points by local integration. Of course, the resulting final phase values for the previously-masked data points may be ambiguous, since these latter values depend upon the particular integration path used for their respective calculations. However, monitor 26, which is used to display the data output, can also identify the possibly-ambiguous phase values derived from the masked data points, for example, by controlling the brightness or color of their displayed image.

Figure 2:
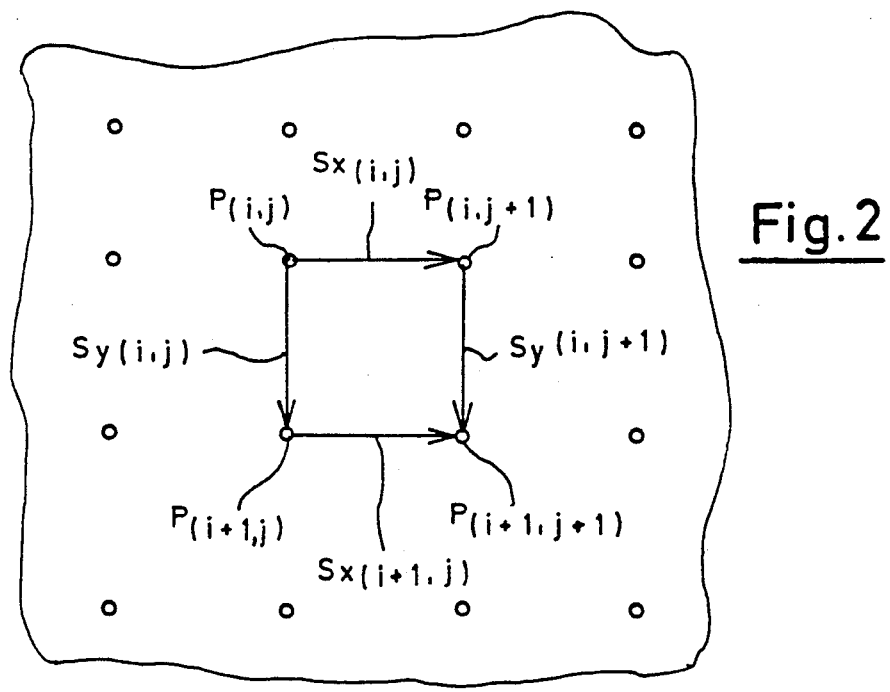
FIG. 2 is a schematic partial view of the two-dimensional image field of a video-type camera, showing only 4×4 image points.

FIG. 2 shows a schematic partial view of 4×4 data points of the two-dimensional image field of CCD camera 9. The data points are symbolized by small circles. Identified in particular is a data point $P_{(i,j)}$ that is assumed to be the j-th data point located in the i-th line of the data field. The data point $P_{(i,j+1)}$ is adjacent to the data point $P_{(i,j)}$ in the line, while the data point $P_{(i+1,j)}$ is adjacent to the data point $P_{(i,j)}$ in the column. The data point $P_{(i+1,j+1)}$ is adjacent to the data point $P_{(i,j+1)}$ in the column.

Calculating unit 11 of FIG. 1 computes, for each of these data points, an associated phase value $W_{(i,j)}$, $W_{(i+1,j)}$, $W_{(i,j+1)}$, $W_{(i+1,j+1)}$; and the modulo 2π differences between these phase values [namely, $S_{x(i,j)}$, $S_{y(i,j)}$, $S_{x(i+1,j)}$, $S_{y(i,j+1)}$] are indicated by arrows in FIG. 2. These arrows indicate that these differences are directed values which, in mathematical terms, form a vector field. The difference $S_{x(i,j)}$ represents the x-component and the difference $S_{y(i,j)}$ the y-component of the vector field for data point $P_{(i,j)}$. Accordingly, the directions of these differences must be taken into account in their integration or summation. Therefore, if the sign-correct sum of these modulo 2π differences is to be computed around this partial field comprising the data points $P_{(i,j)}$, $P_{(i,j+1)}$, $P_{(i+1,j)}$, $P_{(i+1,j+1)}$, the following sum is attained $$Sum_{(i,j)} = S_{x(i,j)} + S_{y(i,j+1)} - S_{x(i+1,j)} - S_{y(i,j)} \quad (1)$$

with the proviso that the summation is clockwise.

The above-described multi-step masking method of the invention will now be shown pictorially with reference to FIGS. 3a-c, each of which illustrates schematically the same, small image/data field 53, having only 10×7 data points. Again, the data points are symbolized by small circles. Identified in particular are the data points P(1,1) through P(1,10) of the first line of the data field, the data points P(1,1) through P(7,1) of the first column of the data field, as well as the data points P(7,1) through P(7,10) of the last line of field 53. Image field 53 is divided into a total of 70 square partial fields, one of which in FIG. 3a being identified by the reference numeral 54. For each of these 70 partial fields, the sign-correct sum of the modulo 2π differences between the phase values of its individual data points is calculated first. For example, for partial field 54, formed by data points P(1,1), P(1,2), P(2,1), and P(2,2), the initial sum is:

$$Sum_{(1,1)} = S_{x(1,1)} + S_{y(1,2)} - S_{x(2,1)} - S_{y(1,1)} \quad (4)$$

and for the adjacent partial field 56, comprising data points P(1,2), P(1,3), P(2,2), and P(2,3), the initial sum for the path of points is:

$$Sum_{(1,2)} = S_{x(1,2)} + S_{y(1,3)} - S_{x(2,2)} - S_{y(1,2)} \quad (5)$$

equations (4) and (5) being specific applications of equation (1) in which, with reference to the phase differences ($S_{x(i,j)}$, $S_{y(i,j)}$, ...) illustrated in FIG. 2, i represents the column-position numbers 1 through 10, and j represents the line-position numbers 1 through 7. Similar initial sums are computed for all of the partial fields 54,56 ... of the data field 53.

Only when all of the partial fields are free from vortexes are the measured values of all the data points consistent, and only then can final phase values be computed unambiguously by path integration via the modulo 2π differences ($S_{x(i,j)}$, $S_{y(i,j)}$).

FIG. 3b shows the same data field 53 as FIG. 3a. Also, the identifications of the data points are identical to those of FIG. 3a. It is assumed that the initial summations for each of the partial fields 54,56 ... have been made; and that values different from zero have been computed only for three partial fields 45,46,47. The data points (P(2,3), P(2,4), P(3,4), P(3,3)); (P(3,2), P(3,3), P(4,3), P(4,2)); (P(3,7), P(3,8), P(4,8), P(4,7)) are masked by filter 21 (FIG. 1b); and this masking is indicated by small crosses over said data points in FIG. 3b. As a result, "holes" (indicated by dotted lines) have been formed in the image field. Next, summations corresponding to path integrals are carried out by the third filter 22 (FIG. 1b) along the edges of each hole. This is indicated by the arrows in FIG. 3b, i.e., the sum $$n_1 = \sum_{j=2}^{4} S_{x(1,j)} + \sum_{i=1}^{3} S_{y(i,5)} - S_{x(4,4)} + S_{y(4,4)} - \qquad (6)$$

$$\sum_{j=1}^{3} S_{x(5,j)} - \sum_{i=2}^{4} S_{y(i,1)} - S_{x(2,1)} - S_{y(1,2)}$$

is computed along the path 57 around the partial fields 46,47 and the sum $$n_2 = \sum_{j=6}^{8} (S_{x(2,j)} - S_{x(5,j)}) + \sum_{i=2}^{4} (S_{y(i,9)} - S_{y(i,6)}) \qquad (7)$$

is computed along the path 49 around partial field 45. In addition, filter 3 also computes the summation corresponding to the path integral around the outer edge 48 of the two-dimensional data field, namely:

$$n_3 = \sum_{j=1}^{9} (S_{x(1,j)} - S_{x(7,j)}) + \sum_{i=1}^{6} (S_{y(1,10)} - S_{y(i,1)}) \qquad (8)$$

It is assured that image points exhibiting inconsistent data values are localized to these masked partial fields only when all three sums $n_1$, $n_2$, and $n_3$ have a value of zero. If so, final phase values in the unmasked data points can then be computed unambiguously via the differences ($S_{x(i,j)}$, $S_{y(i,j)}$).

However, should any sum have a value different from zero, its associated partial fields are combined, by the masking of intermediate data points, until the sum around the combined data fields disappears. Similarly, if the sum $n_3$ produces a value different from zero around the outer edge 48 of the entire field 53, the edge of the two-dimensional data field is connected with one or more holes inside the data field until the sum of phase differences along a closed path, which includes image points adjacent said inside holes, becomes zero. It is always possible to combine the holes with each other or, optionally, to combine the holes with the edge of the entire data field, in such a manner that the sum of a path adjacent the combined partial fields disappears.

As indicated above with reference to first filter 20 (FIG. 1b), if the external edge of the two-dimensional data field is very irregular, those image points which do not belong to at least one partial field are masked. Further, in order to combine the partial fields with each other or with the external edge of the two-dimensional field, the shortest path between these inconsistent partial fields is selected. This assures that no more data points are masked than are absolutely necessary.

FIG. 3c shows the case where the sums $n_1$ and $n_2$ have values different from zero and the sum $n_3$ has the value zero around the outer edge of the two-dimensional field. In this case, points P(3,5) and P(3,6) are also masked, because points P(3,5) and P(3,6) are located on the shortest path between the hole created by the masking of partial field 45 and the hole created by the two other masked partial fields 46,47. It is assumed that, as a result of this additional masking, image holes 45, 46, and 47 are combined and that the sum of the phase differences along a path 52 around the combined partial fields has the value of zero.

Final phase values can be computed by path integration via the differences ($S_{x(i,j)}$, $S_{y(i,j)}$) of the phase values of the unmasked image points. For the computation of such path integrals, a common starting point must be arbitrarily selected. For example, if data point P(7,1) is chosen as the common starting point and the final phase value for this point is arbitrarily set equal to zero, the final phase value V(4,5) for the image point P(4,5) along the path of integration (dash-and-dot line 55) is $$V(4,5) = \sum_{j=1}^{4} S_{x(7,j)} - \sum_{i=4}^{6} S_{y(i,5)} \qquad (9)$$

The final phase values for the unmasked data points are not dependent on the particular integration path used for their calculation, so long as the integration does not occur over masked data ranges. After final and unambiguous phase values V(i,j) have been calculated for all unmasked data points, final phase values V(i,j) for the masked data points are then computed using the unambiguous phase values V(i,j) by local integration, i.e., by adding the respective modulo $2\pi$ differences between the unambiguous phase values and the initially calculated (but inconsistent) phase values of the masked points. For example, a final phase value V(3,5)=V(4,5)−Sy(3,5) may be calculated by addition for the masked data point P(3,5). Although this final phase value V(i,j) for the masked data points will not be absolutely unambiguous, the above-described method assures that the use of such inconsistent measured values will not globally corrupt the phase map.

The two-dimensional data field of FIGS. 3a-3c which comprises only 70 data points is used only to facilitate explanation of the method of the invention. In practical applications, considerably larger data fields are provided. The photosensitive surfaces of commercially available CCD cameras comprise, for example, 512×512 or 1024×1024 individual photosensitive diodes. Each diode represents an image/data point of the two-dimensional field.

FIG. 1a serves only as one example of interferometric surface testing which can be significantly improved by my inventive method. As indicated above, the inventive method can also be used advantageously in conjunction with all measuring processes in which modulo $2\pi$ phase values are calculated from bar patterns.

I claim:

1. In a method for reducing the effects of noise in the optical testing of samples in which information pertaining to the sample in the form of a pattern of light recorded by a camera is evaluated along a two-dimensional raster of image points, said method having the steps of:

using the brightness of the pattern to compute a corresponding phase value, expressed in modulo $2\pi$, for each image point;

calculating the differences, in modulo $2\pi$, between the phase values of adjacent image points in a line and between the phase values of adjacent image points in a column for said entire raster;

computing a first sign-correct sum of said modulo $2\pi$ differences along a closed path around each of a plurality of partial fields, each such partial field being delineated by a predetermined set of adjacent image points; and masking all image points in each partial field for which said sign-correct sum is not zero so that each said masked partial field forms a hole in said image pattern, said holes being omitted from further evaluation of said pattern image;

the improvement comprising the further steps of:

computing a second sign-correct sum of said modulo $2\pi$ differences along a closed path delineated by image points positioned around each said hole, and, for those closed paths for which said second sign-correct sum is not zero, masking the image points between said holes to combine said holes until a second sign-correct sum of said modulo $2\pi$ differences along a closed path of image points positioned around said combined holes becomes zero.

2. The method of claim 1 wherein, when masking the image points between said holes to combine said holes, said final masking step comprises the further step of choosing the shortest path between said masked partial fields.

3. The method of claim 1 wherein said masking step further comprises masking any image point which is not part of at least one of said partial fields delineated by a predetermined set of adjacent image points.

4. The method of claim 1 wherein said second sum computing step comprises the further steps of:

computing a second sign-correct sum of said modulo $2\pi$ differences along a closed path delineated by outermost unmasked image points of said two-dimensional raster, and, if said computed second sum for said outermost image points does not equal zero, combining at least one of said outermost image points with at least one of said masked partial fields by masking the image points between said outermost image point and said masked partial field until a second sign-correct sum of said modulo $2\pi$ differences along a closed path which includes image points positioned adjacent said combined partial field becomes zero.

5. The method of claim 1 comprising the further step of:

determining a final phase value for each unmasked image point by summing the modulo $2\pi$ differences between the first computed phase values along a path of unmasked image points interconnecting each said unmasked image point with a common reference point.

6. The method of claim 5 comprising the further step of:

using said final phase value of said unmasked points to determine a final phase value for masked image points adjacent said unmasked points, by adding the modulo $2\pi$ differences between the final phase value determined for each said unmasked point and said initially computed phase value for said adjacent masked point.

7. The method of claim 1 wherein said pattern of light recorded by the camera is an interferogram.

* * * * *